US010594738B2

(12) United States Patent
Hu et al.

(10) Patent No.: US 10,594,738 B2
(45) Date of Patent: *Mar. 17, 2020

(54) ROTATION OF AUTHORIZATION RULES IN MEMORY OF AUTHORIZATION SYSTEM

(71) Applicant: Visa International Service Association, San Francisco, CA (US)

(72) Inventors: Hung-Tzaw Hu, Saratoga, CA (US); Haochuan Zhou, Redwood City, CA (US); Benjamin Scott Boding, Mountain View, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/412,090

(22) Filed: May 14, 2019

(65) Prior Publication Data

US 2019/0268382 A1    Aug. 29, 2019

Related U.S. Application Data

(63) Continuation of application No. 15/133,134, filed on Apr. 19, 2016, now Pat. No. 10,333,982.

(51) Int. Cl.
G06F 21/00 (2013.01)
H04L 29/06 (2006.01)
(Continued)

(52) U.S. Cl.
CPC .............. H04L 63/20 (2013.01); G06F 21/30 (2013.01); G06F 21/31 (2013.01); G06F 21/316 (2013.01);
(Continued)

(58) Field of Classification Search
CPC ........ G06F 21/30; G06F 21/31; G06F 21/316; G06F 21/45; G06F 21/50; G06F 21/60;
(Continued)

(56) References Cited

U.S. PATENT DOCUMENTS 7,840,520 B2   11/2010  Nandy
2008/0141374 A1  6/2008  Sidiroglou et al.
(Continued)

OTHER PUBLICATIONS

U.S. Appl. No. 15/133,134, "Non-Final Office Action", dated Jun. 25, 2018, 13 pages.
(Continued)

*Primary Examiner* — Edward Zee
(74) *Attorney, Agent, or Firm* — Kilpatrick Townsend & Stockton LLP

(57) ABSTRACT

Embodiments of the invention generally relate to methods and systems for operating authorization rules. An authorization rule has conditions that may be satisfied by an authorization request. A rule is rotated between the first mode and the second mode over a time interval wherein a first set of authorization requests are received. A first subset of the first set of authorization requests may not be rejected. After the first time interval, the authorization requests that were not rejected may be validated through an independent process. An accuracy rate for the rule is determined based on the portion of authorization requests that are valid and satisfied the conditions of the rule.

20 Claims, 7 Drawing Sheets

(51) Int. Cl.
*G06F 21/31* (2013.01)
*G06F 21/30* (2013.01)
*G06F 21/55* (2013.01)

(52) U.S. Cl.
CPC ............ *G06F 21/554* (2013.01); *H04L 63/10* (2013.01); *H04L 63/1408* (2013.01)

(58) Field of Classification Search
CPC ... G06F 21/604; H04L 63/08; H04L 63/0876; H04L 63/10
See application file for complete search history.

(56) References Cited

U.S. PATENT DOCUMENTS

| | | |
|---|---|---|
| 2009/0292568 A1 | 11/2009 | Khosravani et al. |
| 2010/0305993 A1* | 12/2010 | Fisher ................ G06Q 10/0635 705/7.28 |
| 2012/0173465 A1 | 7/2012 | Hore et al. |
| 2013/0055367 A1 | 2/2013 | Kshirsagar et al. |
| 2013/0326579 A1 | 12/2013 | Bhatti et al. |
| 2014/0282856 A1 | 9/2014 | Duke et al. |
| 2015/0026061 A1 | 1/2015 | Siegel et al. |
| 2015/0143525 A1 | 5/2015 | Naldurg et al. |
| 2015/0222667 A1 | 8/2015 | Nayshtut et al. |
| 2017/0302702 A1 | 10/2017 | Hu et al. |

OTHER PUBLICATIONS

U.S. Appl. No. 15/133,134 , "Notice of Allowance", dated Feb. 13, 2019, 5 pages.
U.S. Appl. No. 15/133,134 , "Supplemental Notice of Allowance", dated Apr. 3, 2019, 2 pages.
EP17786346.1 , "Extended European Search Report", dated Jan. 16, 2019, 9 pages.
PCT/US2017/026838 , "International Search Report and Written Opinion", dated Jul. 13, 2017, 10 pages.

* cited by examiner

ROTATION OF AUTHORIZATION RULES IN MEMORY OF AUTHORIZATION SYSTEM

The present application is a continuation of, and claims the benefit and priority of U.S. application Ser. No. 15/133,134, filed Apr. 19, 2016, entitled "ROTATION OF AUTHORIZATION RULES IN MEMORY OF AUTHORIZATION SYSTEM," the entire contents of which is incorporated herein by reference for all purposes.

BACKGROUND

Access to a resource may be granted in response to an authorization request. However, some authorization requests may be fraudulent. One or more authorization rules may be used to reject the authorization request based on whether conditions of the authorization rules are satisfied. For example, an authorization request may be rejected if parameters of the authorization request satisfy conditions of at least one of the authorization rules. The conditions for each of the authorization rules may be selected based on a representative training sample that includes known patterns or instances of fraudulent or invalid authorization requests. Accordingly, authorization requests may be checked against the authorization rules in order to deny fraudulent requests to access the resource.

There is a need to ensure that the authorization rules have not become obsolete or inaccurate. There is also a need to determine which authorization rules have higher accuracy compared to others. Embodiments of the invention address these and other problems.

SUMMARY

Embodiments of the invention generally relate to methods and systems for rotation of authorization rules.

One embodiment of the invention provides an authorization computer comprising a processor circuit. The authorization computer also comprises a memory coupled to the processor circuit and a non-transitory computer-readable storage medium coupled to the processor circuit and storing code executable by the processor circuit for implementing a method for operating authorization rules. The method includes loading into the memory a plurality of authorization rules including a first rule. Each authorization rule of the plurality of authorization rules is assigned to a first mode or a second mode. The authorization rules may be used to reject authorization requests that satisfy its conditions when it is assigned to the first mode. Each authorization rule may not be used to reject authorization requests when assigned to the second mode. The method further includes rotating the first rule between the first mode and the second mode over a time interval. The method further includes receiving a first set of authorization requests during a first time period of the time interval, the first rule being assigned to the second mode during the first time period. The method further includes determining a first subset of the first set of authorization requests that satisfy conditions of the first rule. The method further includes confirming, after the first time interval, which of the authorization requests in the first subset are valid through an independent process. The method further includes determining a first accuracy rate for the first rule based on the portion of authorization requests in the first subset that are valid.

Another embodiment of the invention provides a method for operating authorization rules. The method includes loading, into a memory circuit, a plurality of authorization rules including a first rule. Each authorization rule of the plurality of authorization rules is assigned to a first mode or a second mode. Each authorization rule may be used to reject authorization requests that satisfy its conditions when it is assigned to the first mode. Each authorization rule may not be used to reject authorization requests when assigned to the second mode. The method further includes rotating the first rule between the first mode and the second mode over a time interval. The method further includes receiving a first set of authorization requests during a first time period of the time interval. The first rule is assigned to the second mode during the first time period. The method further includes determining a first subset of the first set of authorization requests that satisfy conditions of the first rule. The method further includes confirming, after the first time interval, which of the authorization requests in the first subset are valid through an independent process. The method further includes determining a first accuracy rate for the first rule based on the portion of authorization requests in the first subset that are valid.

Further details regarding embodiments of the invention can be found in the Detailed Description and the Figures.

TERMS

Figure 1:
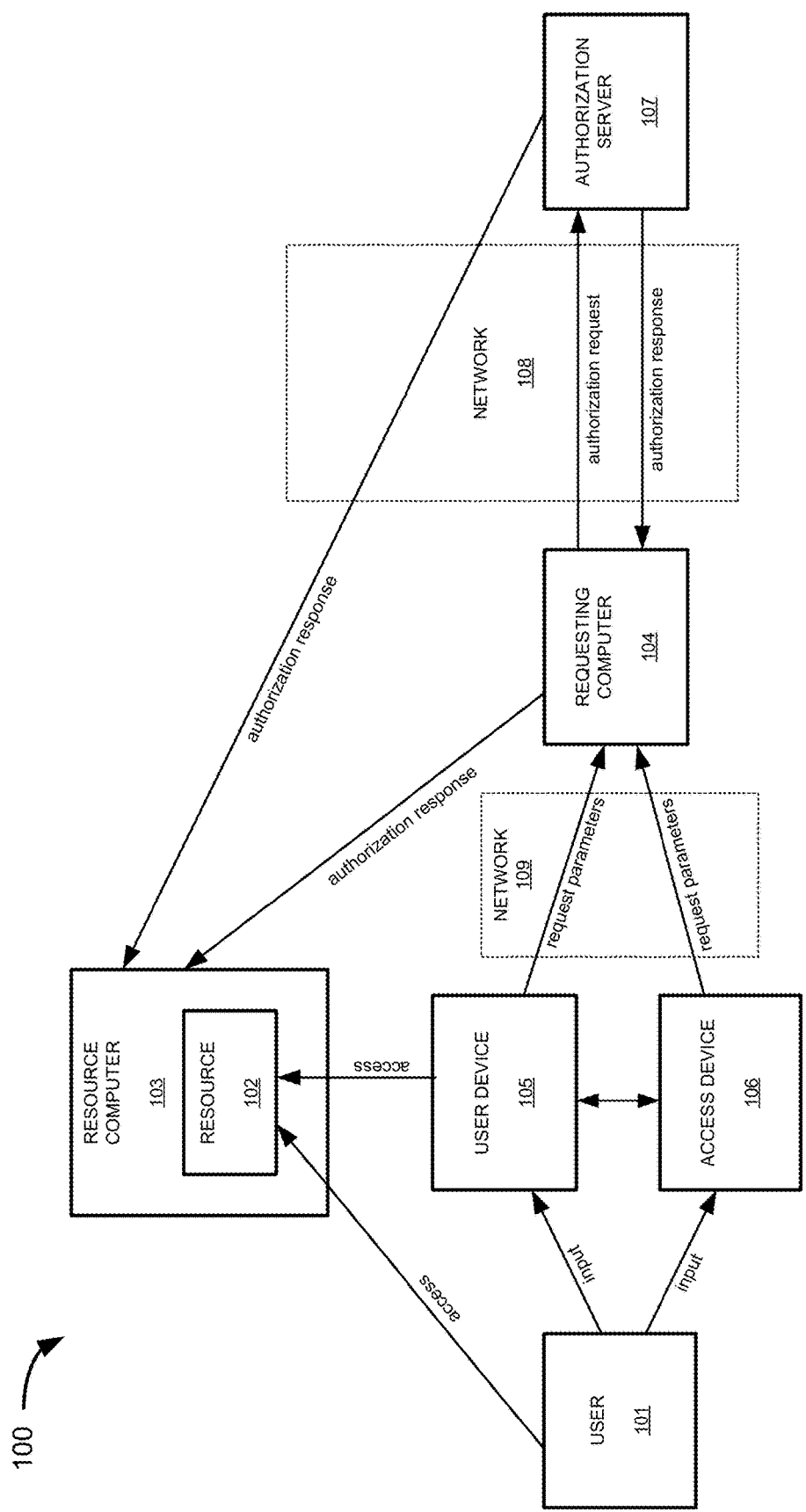
FIG. 1 is a high-level block diagram of a user requesting access to a resource according to an embodiment of the invention.

Prior to discussing embodiments of the invention, description of some terms may be helpful in understanding embodiments of the invention.

The term "authorization request" generally refers to a request to access a resource. The authorization request may be received from a requesting computer (e.g., a potential user of the resource). The authorization request may include authorization request parameters, such as an authorization request identifier, a time, a date, a requesting computer identifier, an account identifier, an account credential, a geo-location, biometric information, or any other suitable information.

The term "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction).

The term "authorization rule" may include any procedure or definition used to determine an authorization rule outcome for an authorization request based on certain criteria. In some embodiments, the rule may comprise a rule condition and a rule outcome. A "rule condition" may specify a logical expression describing the circumstances under which the outcome is determined for the rule. For example, an authorization request may have an account identifier parameter and a geo-location parameter and an authorization rule may have conditions that are satisfied (i.e., the authorization rule is "triggered") if the geo-location in the authorization request is more than 10 feet away from a stored geo-location for the account stored in a database of the authorization server. An example authorization rule outcome for this authorization request may be "rejected". The authorization server may reject the authorization request since the outcome of at least authorization rule is "rejected." In another example, the authorization request may include biometric information as a parameter and an authorization rule may have a condition that is satisfied when the biometric information in the authorization request is inconsistent with biometric data stored in a database of the authorization server.

An "authorization rule outcome" for an authorization request may represent an outcome determined by that rule based on the conditions of the rule and the parameters of the authorization request. However, an authorization rule outcome associated with a transaction may not necessarily determine the outcome of the authorization request (e.g., whether access to the resource is granted or rejected). In some embodiments, the authorization server may reject an authorization request if any of the authorization rules have an outcome of "rejected."

The term "authorization request outcome" may include any determination of whether to grant access to the resource. The authorization request outcomes may include "accepted," "rejected," or "review." The "accepted" outcome may indicate that the requesting computer may be granted access to the resource. The "rejected" outcome may indicate that the requesting computer may be denied access to the resource. The "review" outcome may indicate that the requesting computer may be granted access to the resource depending on an independent review process. In various embodiments, other outcomes or other meanings of these outcomes may be used.

The term "prevention mode" generally refers to a mode of operating an authorization rule wherein the authorization server may reject an authorization request that that satisfy one or more conditions of the authorization rules. Authorization rules assigned to the prevention mode may be used to prevent fraudulent access to a resource.

The term "surveillance mode" generally refers to a mode of operating an authorization rule wherein the authorization server may not reject an authorization request that that satisfy one or more conditions of the authorization rules. The surveillance mode may be used to evaluate the accuracy and performance of an authorization rule based on an independent verification process.

The term "independent process" generally refers to a process for verifying or validating authorization requests which is independent from the operation of the authorization rules. For example, if the resource is a building, then the independent process may include review of security camera footage to determine if an unauthorized person has access to the building. If the resource is a computer account, the independent process may identify an authorization request as being invalid based on a notification from an administrator of the computer account. In another example, if the resource is an account for conducting a transaction, the independent process may include a determination of whether the transaction was reversed (e.g., a charge-back was made for a payment transaction).

The term "trigger frequency" is a metric that generally refer to the number of authorization requests that satisfy one or more conditions of a certain authorization rule (i.e., the authorization rule is "triggered"). In one example, conditions of an authorization rule are satisfied by 10 authorization requests out of 1000 authorization requests. In this example, the trigger frequency of that authorization rule is 10 and the relative trigger frequency is 1% of the total number of authorization requests.

The term "true fraud attempting rate" refers to the actual number of fraudulent authorization requests received, including authorization requests that are both rejected and accepted. The true fraud attempting rate may be determined based on the percentage of accepted authorization requests which have been determined to be invalid by the independent process.

An "authorization rule group" may include a grouping of authorization rules where each rule in the group is assigned to the same operating mode. For example, each authorization rule in a group may be assigned to the prevention mode. In another example, each authorization rule in a group may be assigned to the surveillance mode.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

As used herein, the term "providing" may include sending, transmitting, making available on a web page, for downloading, through an application, displaying or rendering, or any other suitable method. In various embodiments of the invention, rule profiles, rule outcome frequencies, and rule outcome disposition frequencies may be provided in any suitable manner.

DETAILED DESCRIPTION

Resources may be secured to prevent unauthorized users from accessing them. A prospective user of the resource may request access to the resource by providing authorization information in an authorization request. For example, user may present a key or enter a passcode in order to access a locked building, enter a password to access a secured a computer account or file, or enter a personal identification number to make a transaction on a payment account. However, some authorization requests may include valid authorization information while actually being fraudulent. For example, a user that is not authorized by an owner of the resource to use the resource may present authorization information of an authorized user in order to gain access to the resource. To prevent fraudulent access to the resource, an authorization server may consider certain parameters of the authorization request to see if they match known instances of fraudulent activity.

Rules may be used to determine whether a given authentication request would be deemed valid. But, it is problematic to test rules for false positives while using the rules to prevent fraud. Embodiments are directed to computer techniques for changing modes of rules loaded in memory so that rules can be checked for false positives, as well as allowing an authentication system to operate to prevent fraud.

I. Block Diagram for Authorization

The process of requesting access to a resource is further described below with reference to FIG. 1.

FIG. 1 is a high-level block diagram 100 of a user 101 requesting access to a resource 102, according to an embodiment of the invention. The resource 102 may be a physical building, a computer account or file, or a payment account. The user 101 may access the resource directly or by using a user device 105 (e.g., a mobile device or a computer). Access to the resource may be granted or denied by a resource computer 103. The resource computer 103 may comprise the resource 102 or the resource 102 may be separate from the resource computer 103. For example, where the resource 102 is access to a building, the resource computer 103 may be integrated into the building or a door of the building and the resource computer 103 may grant the user 101 access to the resource 102 by unlocking the door. In another example, the resource 102 is a computer account or file, the resource computer 103 comprises the computer account or file (i.e., the resource), and the resource computer 103 may grant access to the user device 105 of the user 101.

The resource computer 103 may to grant access to the user 101 or the user device 105 based on a determination of an authorization server 107. The user 101 may request access to the resource 102 by inputting authorization information into an access device 106 of a requesting computer 104. The access device 106 may be integrated into the requesting computer 104 or it may be a separate device. The access may be any input device for receiving the corresponding authorization information. For example, a keypad may receive a personal identification number, a keyboard may receive a password or passcode, finger print reader may receive a scan of a finger of the user 101, a retina scanner may receive a scan of the an eye of the user's 101, or a biometric reader may receive biometric information of the user 101. The user 101 may also use the user device 105 to input the authorization information. The user device 105 and the access device 106 may also communicate data (e.g., data indicating the user's input) with each other.

The user device 105 or the access device 106 may send a plurality of parameters for the authorization request, the parameters including the authorization information, to the requesting computer 104. The user device 105 and the access device 106 may be coupled to the requesting computer 104 or they may be connected via a network 109. The parameters may include the authorization information, a credential of the user 101 or the user device 105, a time of day of the request, a date of the request, an identifier of one of the user 101, the user device 105, the access device 105, the resource 102, and the resource computer 103, or a geo-location of one of the user 101, the user device 105, the access device 105, the resource 102, and the resource computer 103.

The requesting computer 104 may receive the request parameters from the user device 105 and the access device 105 and generate an authorization request based on the received request parameters. The requesting computer may send the authorization requests to the authorization server 107. The requesting computer 104 may be coupled to the authorization server 107 or it may be connected to the authorization server via network 108. The authorization server 107 may also be coupled to the resource computer 103 or it may be connected to the resource computer 103 via network 108.

As further described below, the authorization server 107 may comprise a plurality of authorization rules that can be used to determine whether an authorization request is valid or not. An authorization rule has a plurality of conditions that may be compared to the parameters of an authorization request. The authorization server may determine that an authorization request should be rejected (e.g., the user 101 is denied access to the resource 102) is the parameters of the authorization request satisfy one or more conditions of one or more of the authorization rules. The authorization server 107 can send an authorization response to the requesting computer 104 including an outcome indication which indicates whether the authorization request was rejected or accepted. The authorization response may also indicate that they requesting computer should review the authorization request (e.g., request additional information from the user 101 or the user device 105). The authorization server 107 may also send the authorization response to the resource computer 103.

The requesting computer 104 can send the authorization response to the resource computer 103. The requesting computer may be coupled to the resource computer or it may be connected to the authorization server via the network 109. The resource computer may grant or deny access to the resource 102 based on the authorization response. For example, the resource computer may unlock the door of the building, or it may grant permissions to a computer account or file, or it may authorize a transaction against a payment account.

The authorization rules used by the authorization server 107 may reject authorization requests that are fraudulent. However, the authorization rules may also inadvertently reject authorization requests from users 101 or user devices 105 that are in fact valid (e.g., the user 101 or the user device 105 has been authorized by the owner of the resource 102). An authorization rule may become less accurate at identifying truly fraudulent authorization requests over time if the patterns of fraudulent activity have changed. To optimize the accuracy of the authorization rules, the authorization server 107 may evaluate the performance of the authorization rules and modify the conditions of the authorization rules, or replace authorization rules, based on their performance, as further described below.

II. Authorization Rules

As described herein, an authorization server computer ("authorization server") may store account information indicating certain accounts that are authorized to access certain resources. A requesting computer (e.g., a computer used by a user of a resource to access the resource) may send an authorization request including an account identifier to the authorization server computer to request access to the resource. For example, the resource may be computer resource (e.g., stored data or a networked computer account), a physical resource (e.g., a tangible object or a physical location), or a transactional resource (e.g., an account for performing a transaction). The authorization server may determine whether to grant the requesting computer access to the resource based on the account indicator and the stored account information.

The authorization server may comprise a processor circuit and a memory unit that is coupled to the processor circuit. The authorization may also comprise a non-transitory computer-readable storage medium coupled to the processor circuit. The storage medium may store code that is executable by the processor circuit for implementing the methods for operating authorization rules described here.

However, some authorization requests may be fraudulent. For example, a requesting computer that is not authorized to access the resource may send an authorization request indicating an account that is authorized to access the resource. Accordingly, the authorization server may check parameters of the authorization request (e.g., authorization information, credentials, a location of the requesting computer, or a time of day when the authorization request was received) against one or more authorization rules in order to prevent fraudulent access to the resource. One or more authorization rules may be used to reject the authorization request if the parameters of the authorization request satisfy one or more conditions of the authorization rule. For example, an authorization rule may reject the authorization request if a credential does not match an account identifier, if a location of the requesting computer does not match a certain location, or if the authorization request is received at a certain time.

The conditions for each of the authorization rules may be selected based on a representative training sample including known instances or patterns of fraudulent or invalid authorization requests. Such instances or patterns of fraudulent authorization requests can be determined by an independent process. For example, if the resource is a building, then the independent process may include review of security camera footage. In another example, if the resource is an account for conducting a transaction, the independent process may include a determination of whether the transaction was returned or reversed by an owner of the account.

Authorization rules may be operated in a "prevention" mode. While operating in the prevention mode, the authorization rules may be used to reject authorization requests that satisfy one or more conditions of the authorization rules. Accordingly, the authorization rules may be used to reject authorization requests that may be fraudulent. While authorization rules are an effective way to prevent fraudulent access to resources, they may also inadvertently reject authorization requests that are in fact valid. Furthermore, an authorization rule may become less accurate at identifying truly fraudulent authorization requests over time. For example, the patterns of fraud may have changed and the conditions of the authorization rule may be based on outdated patterns.

The authorization server may evaluate the authorization rules to determine the accuracy for each authorization rule. The accuracy of an authorization rule may be based on a false positive ratio (the number of valid authorization requests that are rejected for each invalid authorization request that is rejected). The accuracy of an authorization rule may also be based on a false positive rate (the percentage of valid authorization requests that were not accepted).

However, when an authorization request is rejected, it may not be possible for the independent process to determine whether the authorization request was truly valid because access to the resource was not granted. For example, it may not be possible to review security camera footage to identify an authorized person in a building since that person was denied access to the building. In another example, a fraudulent transaction may not be reversed or returned if the transactions was not made because it was rejected.

Therefore, in order to evaluate the authorization rules, the authorization server may assign certain authorization rules to operate in a "surveillance" mode, instead of the prevention mode, for certain periods of time. The authorization server may determine whether an authorization request satisfies conditions of an authorization rule assigned to the surveillance mode but the authorization server may not use that authorization rule to reject the authorization request. Instead, the authorization server may evaluate the authorization rule, while it is in the surveillance mode, based on the independent process. The operating modes of authorization rules are described in further detail below.

The authorization server may also assign the authorization rule to different operating modes. For example, the authorization server may also assign the authorization rule to an "active" mode. The authorization rule, when assigned to the active mode, may have an outcome of either "accept," "review," or "reject," when parameters of an authorization request satisfy conditions of the authorization rule. Accordingly, authorization rules assigned to the active mode may be used to accept, review, or reject authorization requests. The authorization server may also assign the authorization rule to an "inactive" mode. The authorization rule, when assigned to inactive mode, may not be used accept, review, or reject authorization requests.

The authorization server may also assign the authorization rule to any other mode. For example, the authorization server may assign the authorization rules a first mode and a second mode, where the authorization rule operates different in the first mode compared to the second mode. The first mode, or the second mode, may be assigned to any of the modes described herein, or any other mode.

III. Operating Modes of Authorization Rules

Authorization rules are have one or more conditions which can be satisfied by the parameters of the authorization request. When one or more conditions of the authorization rule is satisfied, an authorization server can reject or accept the authorization request based on that authorization rule being satisfied by the authorization request. However, as described here, it is advantageous to evaluate the performance of the authorization rules and optimize the conditions of the authorization rules to improve their accuracy. For example, an authorization rule may operate in a "prevention" mode where that rule is used by the authorization server to reject authorization requests satisfying the conditions of that authorization rule. The authorization rule may also operate in a "surveillance" mode where that rule is not used by the authorization server to reject authorization requests satisfying the conditions of that authorization rule, but instead, the authorization server will track whether the conditions were satisfied in order to evaluate the performance of the authorization rule after an independent validation process that validates the authorization request.

Figure 2:
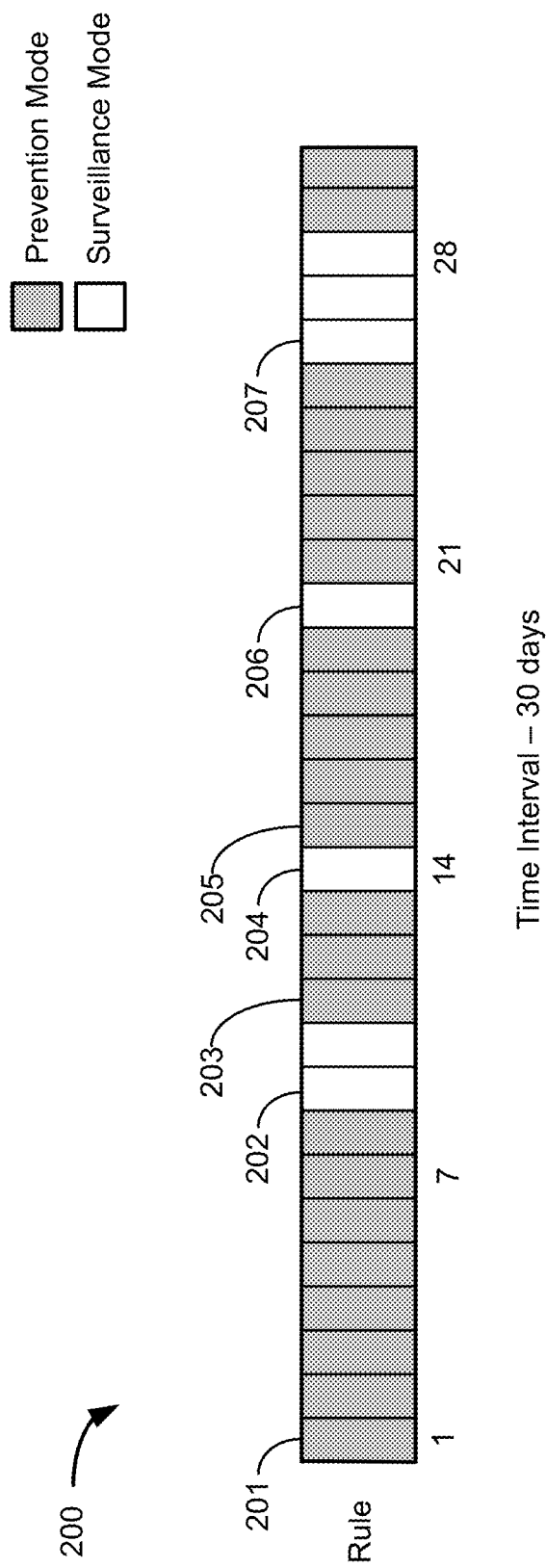
FIG. 2 is a table showing different operating modes for an authorization rule according to an embodiment of the invention.

FIG. 2 is a table 200 showing different operating modes for an authorization rule according to an embodiment of the invention. For example, an authorization rule may operate in several modes. For example, the authorization rule may operate in a "prevention" mode or a "surveillance" mode. As described above, an authorization rule may be used to reject authorization requests that satisfy one or more conditions of the authorization rule while it is assigned to operate in the prevention mode and the authorization rule may not be used to reject authorization requests that satisfy one or more conditions of the authorization rule while it is assigned to operate in the surveillance mode. The authorization rule may also operate in an "active" mode or an "inactive" mode, as described above.

An authorization server may assign the authorization rule to operate in different modes at different times. For example, the authorization server may generally assign the authorization rule to operate in the prevention mode but may assign the authorization rule to operate in the surveillance mode during certain periods of time in order to evaluate the authorization rule as described herein. As such, the authorization server may rotate the authorization rule between a first mode (e.g., the prevention mode) and a second mode (e.g., a surveillance mode) over a time interval (e.g., thirty days). In another example, the authorization server may generally assign the authorization rule to operate in the active mode, but may assign the authorization rule to operate in the inactive mode during certain periods of time in order to evaluate the authorization rule.

In FIG. 2, the table 200 shows an example operation of the authorization rule over a first time interval of thirty days. The coloring of the cells of the table indicate the mode that the authorization rule is assigned to for each day of the time interval. A colored (gray) cell indicates that the authorization rule is assigned to operate in the prevention mode. A non-colored cell (white) indicates that the authorization rule is assigned to operate in the surveillance mode. As described herein, the authorization server may determine whether conditions of the authorization rule are satisfied by an authorization request that is received while the authorization rule is operating in the surveillance mode, but the authorization server may not reject authorization requests that satisfy the conditions of the authorization rule while it is operations in the surveillance mode. The authorization rule may also be assigned to other modes, such as the active mode, the inactive mode, or another mode of operating.

As shown in FIG. 2, the authorization server may rotate the operating mode of the authorization rule over the time interval. The authorization server assigns the authorization rule to operate in the prevention mode on the first day 201 of the thirty day time interval. The authorization rule is assigned to operate in the surveillance mode for the first eight days of the time interval. The authorization server then assigns the authorization rule to operate in the surveillance mode for two days, starting on the ninth day 202 of the time interval. As described herein, the authorization server may evaluate the performance of the authorization rule on the ninth and tenth days of the time interval while the authorization rule is operating in the surveillance mode.

On the eleventh day 203 of the time interval, the authorization server assigns the authorization rule to operate in the prevention mode. The authorization server assigns the authorization rule to operate in the prevention mode for three days. On the fourteenth day 204 of the time interval, the authorization server assigns the authorization rule to the surveillance mode for one day and then rotates the authorization rule back to the prevention mode on the fifteenth day 205. The authorization server also assigns the authorization rule to operate in the surveillance mode on the twentieth day 206 for one day and for three days starting on the twenty sixth day 207. As shown in FIG. 2, the authorization server assigns the authorization rule to operate in the prevention mode on the other days of the time interval.

The authorization server may also use different time intervals. For example, the authorization server may use a twenty four hour time interval and may rotate the authorization rule to different modes for different hours, minutes, or seconds of the time interval. The authorization rule may rotate the authorization rule according to a different pattern in different time intervals. For example, in a later time interval the authorization server may assign the authorization rule to operate in the surveillance mode on different days (e.g. only the first, second, and third days). In some embodiments, the authorization server may rotate the authorization rule according to an interval that is not a time interval. For example, the authorization server may select a new pattern for rotating the authorization rule between modes after a certain number of authorization requests have been received. The authorization server may also rotate the authorization rule between the prevention mode and the surveillance mode based on a pre-determined amount of time within a time interval. The authorization server may also rotate the authorization rule between the prevention mode and the surveillance mode based on a pre-determined number of authorization requests having been received within the time interval.

The authorization server may also rotate the authorization rule between different operating modes over the time interval. For example, the authorization server may rotate the authorization rule between the active mode and the inactive mode over the time interval. The authorization server may also rotate the authorization rule between more than two operating modes. For example, the authorization server may rotate the authorization rule between a first mode, a second mode, a third mode, and a fourth mode having different modes of operation.

IV. Evaluation of Authorization Rules

Authorization rules may be evaluated to determine their performance. If the performance of an authorization rule can be determined, then the conditions of the authorization rule may be modified in order to improve its performance. For example, evaluation of an authorization rule may determine that the authorization rule has a large trigger frequency compared to other authorization rules (e.g., the authorization rule is triggered more frequently) and that the authorization rule is less accurate than other authorization rules (e.g., the authorization rule has a higher rate of false positives). The authorization server may modify the conditions of the rule to reduce the trigger frequency of the rule based on the instances of true positives determined by an independent validation process. Evaluation of an authorization rule by analyzing the outcome of the authorization rule with respect to different authorization requests and different operating modes is further described below.

Figure 3:
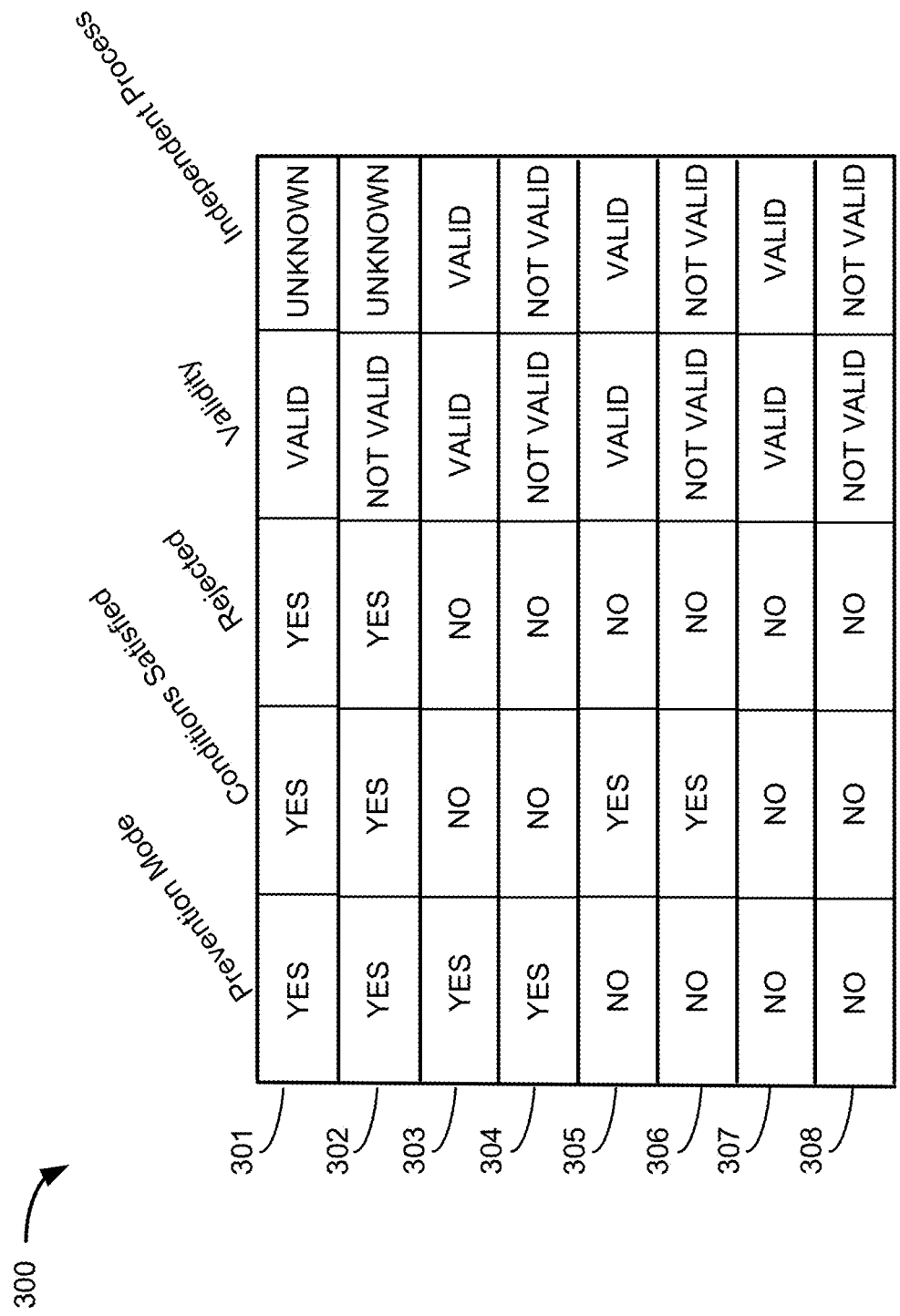
FIG. 3 is an table showing analysis of an authorization rule based on its operating mode according to an embodiment of the invention.

FIG. 3 is an table 300 showing analysis of an authorization rule based on its operating mode according to an embodiment of the invention. As described herein, an authorization server may reject an authorization request when parameters of the authorization request satisfy one or more conditions of on an authorization rule operating in the prevention mode. However, the authorization server may not reject an authorization request satisfying condition of the authorization rule while it is operating in the surveillance mode. Accordingly, the authorization server may evaluate the accuracy of the authorization rule by comparing instances of authorization requests that satisfied the conditions of the authorization rule, but were not rejected while the authorization rule was operating in the surveillance mode, to validation information from an independent process.

For example, a first authorization request 301, second authorization request 302, third authorization request 303, and fourth authorization request 304 may be received by the authorization server while an authorization rule is operating in the prevention mode. A fifth authorization request 305, sixth authorization request 306, seventh authorization request 307, and eighth authorization request 308 may be received by the authorization server while the authorization rule is not operating in the prevention mode (e.g., the authorization rule is operating in the surveillance mode). As shown in FIG. 3, the authorization server may reject the authorization request when then authorization request satisfies conditions of the authorization rule while it is operating in the prevention mode. But the authorization server may not reject the authorization request while the authorization rule is not operating in the prevention mode, regardless of whether the authorization request satisfies conditions of the authorization rule.

The authorization server may evaluate the accuracy (e.g., a false positive rate) of the authorization rule based on an independent process. For example, if the requested resource is a building, then the independent process may include review of security camera footage. In another example, if the requested resource is an account for conducting a transaction, the independent process may include a determination of whether the transaction was returned or reversed by an owner of the account. The independent process may be performed after a time interval for evaluating the authorization rule.

As shown in FIG. 3, the first authorization request 301 and the second authorization request 302 are rejected while the authorization rule is operating in the prevention mode. Accordingly, it may not be possible for the independent process to determine whether the authorization request was truly valid because access to the resource was not granted. Therefore, the validity of the first authorization request 301 and the second authorization request 302 may be unknown since they were rejected. However, the independent process may determine the validity of the other authorization requests 303-308 since these requests were not rejected.

The fifth authorization request 305 satisfied the conditions of the authorization rule. Accordingly, the fifth authorization request 305 would have been rejected by the authorization server had the authorization rule been operating in prevention mode. However, the fifth authorization request 305 was valid (e.g., it was not fraudulent) and the validity was confirmed by the independent process (e.g., no indication of invalidity was determined by the independent process after a certain period of time). This incorrect result in the outcome of the authorization rule may generally be referred to as a false positive. The conditions of the rule may be modified such that the conditions of the authorization rule do not satisfy the parameters of the fifth authorization request 305 since it is a valid authorization request.

The sixth authorization request 306 also satisfied the conditions of the authorization rule. Accordingly, the sixth authorization request 306 would have been rejected by the authorization server had the authorization rule been operating in prevention mode. In fact, the sixth authorization request 306 was not valid (e.g., it was fraudulent) and the invalidity was confirmed by the independent process (e.g., indication of invalidity was determined by the independent process after a certain period of time). This correct result in the outcome of the authorization rule may generally be referred to as a true positive.

The authorization server may determine an accurate rate for the authorization rule based on the outcomes of the authorization rule (e.g., would have rejected or accepted based on its conditions) while the authorization rule is operating in the surveillance mode and the results of the independent process. For example, the authorization server may compare the amount of false positives to the amount of true positives for the authorization rule in order to determine an accuracy rate for the authorization rule.

The authorization server may the number of invalid authorization requests that satisfied the conditions of the authorization rule. The authorization server may compare the combined total number of invalid authorization requests, as confirmed by the independent process, to the total number of authorization requests received in order to determine the "true fraud attempting rate" (e.g., the percent of authorization requests which are invalid). As described above, the authorization server may not be able to determine the accuracy rates of the authorization rules or the true fraud attempting rate if the authorization requests were rejected, and thus, not able to be confirmed by the independent process.

The authorization server may also determine a "trigger frequency" (e.g., a triggering rate) for each authorization rule by comparing the number of authorization requests that satisfy one or more conditions of the rules to the total number of authorization requests received by the authorization server. For example, the relative trigger frequency of each of the authorization rules may be between 0.1% and 0.3%. However, the relative trigger frequency of an authorization rule may also be less than 0.1% or greater than 0.3%. In general, the larger the trigger frequency of an authorization rule is, the more inaccurate the authorization rule may be (e.g., it has a higher false positives rate). For example, a first rule having a relative trigger frequency of 0.1% would generally have a lower false positive rate compared to a second authorization rule having a relative trigger frequency of 1.5%. Accordingly, the authorization rule may be modified (e.g., by the authorization server) to reduce the trigger frequency of the authorization rule in order to reduce its false positive rate. Thus, the set of authorization rules may be optimized to improve accuracy.

The true fraud attempting rate can be compared to the number of invalid authorization requests identified by the independent process in order to determine the number of invalid requests which did not satisfy the conditions of any of the authorization rules. Certain authorization rules may have their conditions modified (e.g., the conditions of the rule are made broader, thereby increasing the trigger frequency of the rule) in order to have their conditions be satisfied by such invalid authorization requests that would not have been rejected. New authorization rules may also be generated to cover such invalid authorization requests. The authorization server may also determine "a total rejection rate" based on the number of authorization requests that satisfy one or more conditions of at least one of the authorization rules compared to the total number of authorization requests received.

V. Rotation of Authorization Rules

An authorization server may determine a plan for rotating a plurality of authorization rules between the prevention mode and the surveillance mode over a time interval in order to evaluate the authorization rules. The authorization server may assign each rule to a certain mode during a certain time period within the time interval. The authorization server may also assign each authorization rules to a certain mode for each authorization request. The authorization server may re-assign each of the authorization rules after the certain time period or after a certain number of authorization requests have been received. As discussed herein, the authorization server may evaluate the rules after the time interval and may modify the conditions of the authorization rules, or replace certain authorization rules with new authorization rules, based on the evaluation of the authorization rules. The authorization server may determine another plan for rotating the plurality of authorization rules over a following time interval using the new and modified authorization rules. Methods for rotating the authorization rules between different modes are discussed in further detail below.

A. Rotation with Stand-by Authorization Rules

Figure 4:
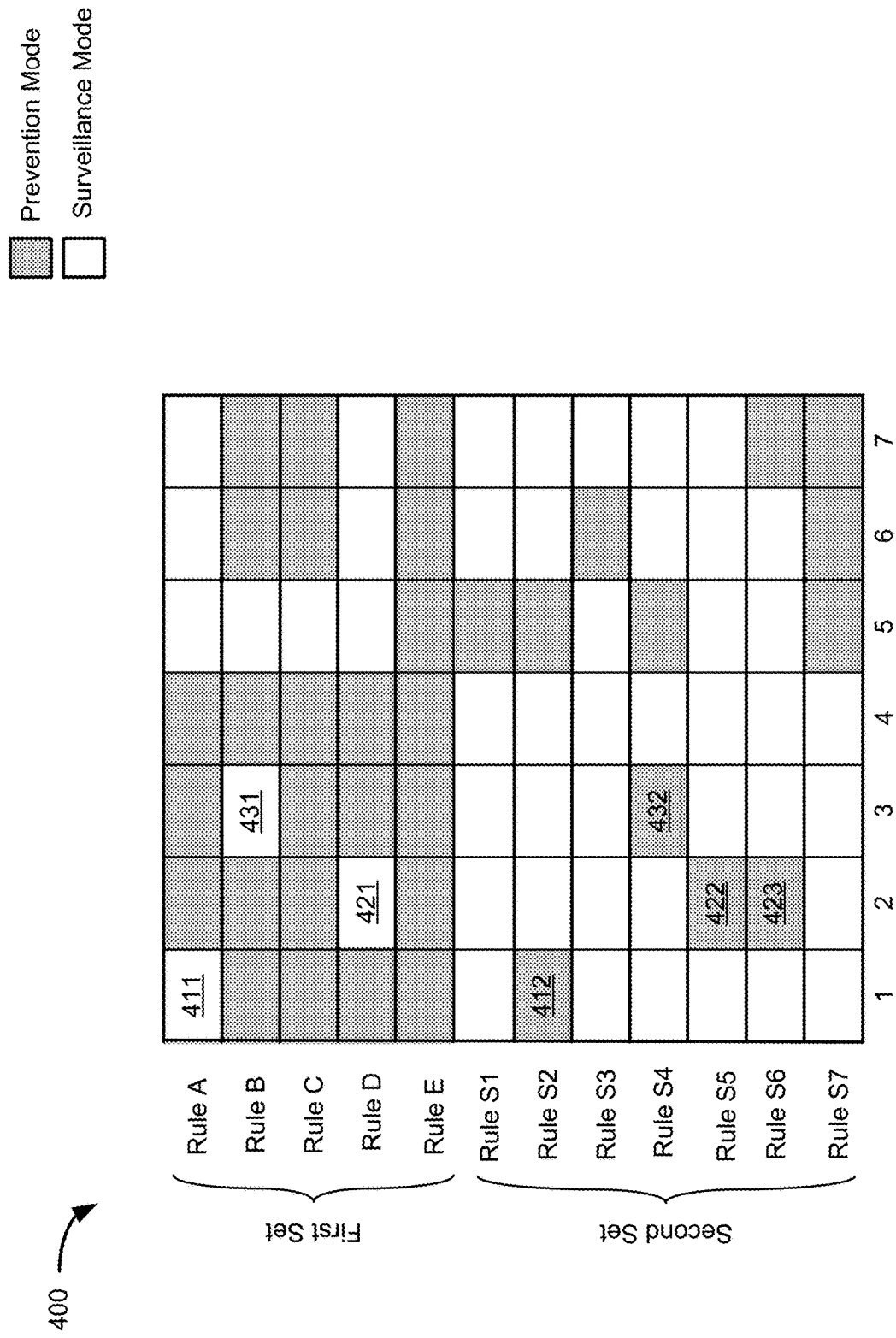
FIG. 4 is a table showing operation of authorization rules and stand-by authorization rules according to an embodiment of the invention

FIG. 4 is a table 400 showing operation of authorization rules and stand-by authorization rules according to an embodiment of the invention. An authorization server may schedule authorization rules to be assigned to a first mode (e.g., prevention mode) or a second mode (e.g., surveillance mode) across a time interval. The authorization server may rotate (e.g., toggle) each of the authorization rules between the first mode and the second mode according to the determined schedule. The coloring of the cells in FIG. 4 indicate the mode that the authorization rule is assigned to for each day of the time interval. A colored (gray) cell indicates that the authorization rule is assigned to operate in the prevention mode. A non-colored cell (white) indicates that the authorization rule is assigned to operate in the surveillance mode.

In this embodiment, the authorization server may use a first set of five authorization rules to reject authorization requests. A different number of authorization rules may be used in other embodiments. The first set of authorization rules includes Rule A, Rule B, Rule C, Rule D, and Rule E. The authorization server may typically assign the first set of rules to the prevention mode.

The authorization server may also use a second set of seven authorization rules as stand-by authorization rules. The second set of authorization rules includes Rule S1, Rule S2, Rule S3, Rule S4, Rule S5, Rule S6, and Rule S7. A different number of stand-by authorization rules may be used in other embodiments. The second set of authorization rules are referred to as "stand-by" rules because the authorization server may not typically assign these authorization rules to the prevention mode (e.g., the second set of rules is typically assigned to the surveillance mode). When the authorization server selects one or more of the authorization rules from the first set to be assigned from the prevention mode to the surveillance mode, the authorization server may also select one or more of the stand-by authorization rules from the second set to be assigned from the surveillance mode to the prevention mode.

As shown in FIG. 4, the authorization server may select certain authorization rules from the first set of authorization rules to be assigned to operate in the surveillance mode on certain days within a seven day time interval. The selection of the authorization rules may be randomly determined by the authorization server or the selection may be pre-determined. The authorization server may select a corresponding stand-by rule to be assigned to operate in the prevention mode to replace the authorization rules in the first set which have been assigned to the surveillance mode. For example, the authorization server assigns Rule A in the first set of authorization rules to the surveillance mode on the first day of the time interval (as shown at cell 411 of table 400) and correspondingly assigns stand-by Rule S2 in the second set of authorization rules to the prevention mode on the same day (as shown at cell 412). That is, the authorization server may rotate stand-by Rule S2 between the surveillance mode and the prevention mode is response to rotating Rule A between the prevention mode and the surveillance mode.

When the relative trigger frequency of each of the authorization rules is similar, then the total rejection rate of the authorization rules may remain similar when one of the authorization rules in the first set is replaced by a stand-by authorization rule in the second set. The authorization server may assign certain rules to the prevention mode or the surveillance mode based on their relative trigger frequencies in order to maintain the total rejection rate. For example, the authorization server may rotate the authorization rules between the prevention mode and the surveillance mode such that the total rejection rate of the rules assigned to the prevention mode is as close to a target rejection rate (e.g., a maximum rejection rate) without going over the target rejection rate. The target rejection rate may be used to ensure that a certain percentage of authorization requests are not rejected.

For example Rule D may have a relative trigger frequency (e.g., a rejection rate) of 0.3%, standby Rule S5 may have a relative trigger frequency of 0.2%, and stand-by Rule S6 may have a relative trigger frequency of 0.1%. During the second day (second time period) of the time interval, the authorization server may assign Rule D of the first set to the surveillance mode (as shown at cell 421). The authorization server may determine that the combined relative trigger frequency of stand-by Rule S5 (0.2%) and stand-by Rule S7 (0.1%) is equal to the relative trigger frequency of Rule D (0.3%). Accordingly, the authorization server may assign stand-by Rule S5 and Rule S6 of the second set to the prevention mode (as shown at cell 422 and cell 423 respective) during the second day while Rule D is assigned to the surveillance mode. The authorization server may also have selected one or more of the other stand-by rules to be assigned to the surveillance mode instead based on the one or more other stand-by rules having a combined relative trigger frequency that is similar to (e.g., within 0.1%) the relative trigger frequency of the authorization rule from the first set being assigned to the surveillance mode.

As shown in FIG. 4, the authorization rule may assigned Rule B to the surveillance mode on the third day (as shown at cell 431). Rule B may have a relative trigger frequency of 0.3%. The authorization server may assign a stand-by rule having a similar relative trigger frequency to the prevention mode for the third day to replace Rule B. Stand-by Rule S4 may have a relative trigger frequency of 0.2%. Accordingly, the authorization server may assign stand-by Rule S4 to the prevention mode on the first day (at cell 432). As such, the authorization server may maintain a similar total rejection rate of the authorization rules assigned to the prevention mode for the third day.

The authorization server may also determine to not assign any of the authorization rules in the first set of authorization rules to the surveillance mode on a certain day of the time interval, as shown on the fourth day in FIG. 4. Accordingly, the authorization server may not assign any of the authorization rules in the second set to the prevention mode on the fourth day. As shown in FIG. 4, the authorization server assigns one or more stand-by rules in the second set of rules to the prevention mode for days where rules in the first set of authorization rules are assigned to the surveillance mode. The operation of replacing authorization rules with stand-by authorization rules allows the authorization server to evaluate the accuracy and performance of the authorization rules in the first set.

B. Rotation of Groups of Authorization Rules

Figure 5:
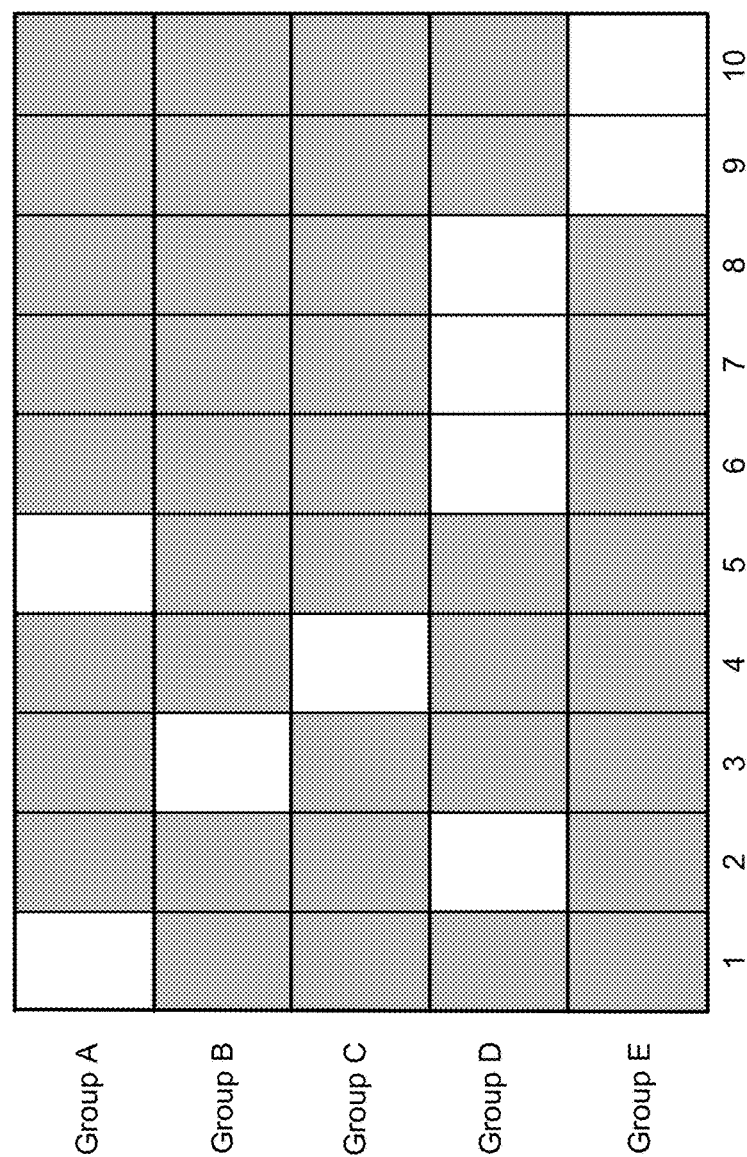
FIG. 5 is a table showing operation of groups of authorization rules according to an embodiment of the invention.

FIG. 5 is a table 500 showing operation of groups of authorization rules according to an embodiment of the invention. An authorization server, as described herein, may divide a plurality of authorization rules into a plurality of groups and assign each group to a first mode (e.g., prevention mode) or a second mode (e.g., surveillance mode) for each authorization request. The coloring of the cells of the table of FIG. 5 indicate the mode that the group of authorization rule is assigned to for each authorization request. A colored (gray) cell indicates that the group is assigned to operate in the prevention mode. A non-colored cell (white) indicates that the group is assigned to operate in the surveillance mode.

The authorization server may divide the authorization rules into the groups based on the relative trigger frequency (e.g., trigger frequency) of that authorization rule compared to the total combined relative trigger frequencies of the plurality of authorization rules. The authorization server may determine a number of groups based on a target rejection rate and the total combined trigger frequency of the plurality of authorization rules. For example, if the plurality of authorization rules have a combined total relative trigger frequency of 10% (e.g., 10% of authorization requests are rejected) and a target rejection rate is 8%, then the authorization server may determine the number of groups to be five. The target rejection rate may also be a range (e.g., 6-10% or 7-9%). Accordingly, the authorization server may select four groups of authorization rules to be operated in the prevention mode and one group of authorization rules to be operated in the surveillance mode such that the rejection rate of the authorization rules assigned to the prevention mode meets the target rejection rate of 8%. The authorization server may group the authorization rules such that each grouping of authorization rules has a similar combined relative trigger frequency related to the other groups (e.g., a 2% relative trigger frequency).

As shown in FIG. 5, the five groups of authorization rules are labeled Group A-E. The authorization server may select four of the groups to be assigned to the prevention mode. The relative trigger frequency of each of the Groups A-E may be 2%. Accordingly, the rejection rate for all transactions may be 8%. The authorization server may randomly select the four groups to be assigned to the prevention mode or the selection of the groups may be pre-demined according to a pattern.

For simplicity, FIG. 5 shows the mode assignments of Groups A-E for ten authorization requests. However, the authorization server may perform the selection of groups for any number of authorization requests. As shown in FIG. 5, the authorization server may select Group A to be assigned to the surveillance mode for a first authorization request. Accordingly, the authorization server may select groups B-E to be assigned to the prevention mode for the first authorization request. For the second authorization request, the authorization server may select Group D to be assigned to the surveillance mode and may assign Groups A-C and Group E to the prevention mode. As shown in FIG. 5, the authorization server may select one of the five groups of authorization rules to be assigned to the surveillance mode for each authorization request.

In other embodiments, the number of groups of authorization rules may be different. For example, in one embodiment the target rejection rate may be 6% and a plurality of authorization rules may have a combined relative trigger frequency of 10%. In this embodiment, the authorization server may divide the plurality of authorization rules into ten groups, each having a 1% relative trigger frequency. For each authorization request, the authorization server may select six of the ten groups to be assigned to the prevention mode and may select the four non-selected groups to be assigned to the surveillance mode. The authorization server selects six of the groups to be assigned to the prevention mode based on the 6% target rejection rate.

VI. Exemplary Authorization System

Figure 6:
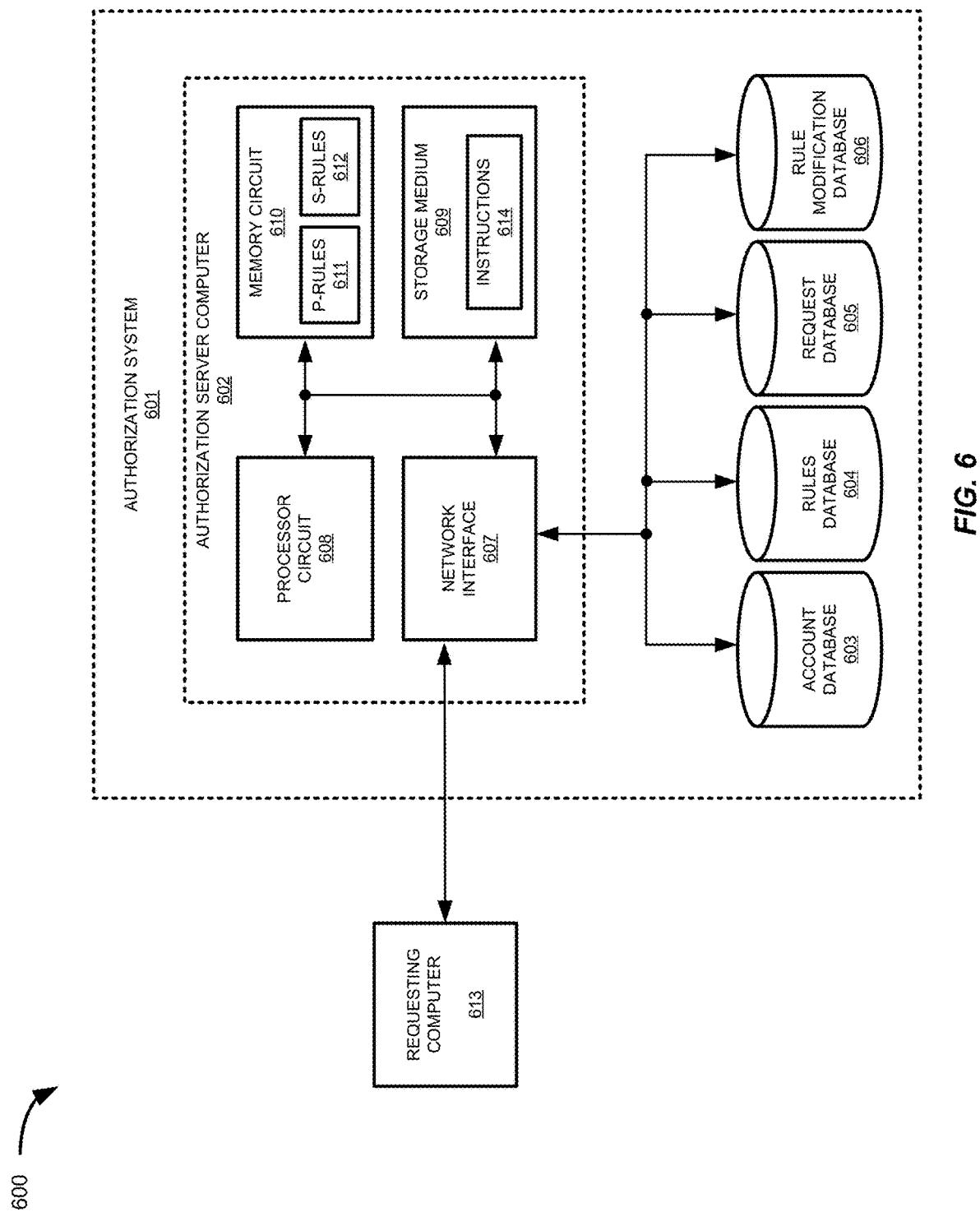
FIG. 6 is a block diagram of components of an exemplary authorization system that may be used to implement embodiments of the invention.

FIG. 6 is a block diagram 600 of components of an exemplary authorization system 601 that may be used to implement embodiments of the invention. The authorization system 601 includes an authorization server computer 602 which may receive authorization requests and determine whether to accept or rejection authorization requests based on a plurality of authorization rules as described above. The various components of the authorization system 601 may be embodied by computer hardware or computer code stored on a non-transitory computer readable storage medium.

The authorization server computer 602 may comprise a processor circuit 608. The processor circuit 608 may execute instructions to perform the functions of the authorization server described herein. The processor circuit 608 may be coupled to a memory circuit 610 configured to store data. The processor circuit 608 may read data from the memory circuit 610 and write data to the memory circuit 610. For example, the processor circuit 608 may load into the memory circuit 610 a plurality of authorization rules. For example, processor circuit 608 can load a first plurality of authorization rules 611 that are operating in the "prevention" mode and a second plurality of authorization rules 612 that are operating in the "surveillance" mode into the memory circuit 610. According to the methods for operating authorization rules described herein, the processor circuit 608 can load certain authorization rules into certain locations of the memory circuit 610 in performing the rotation of the authorization rule between the "prevention" mode and the "surveillance" mode. For example, rules being use for prevention mode can be loaded into a cache of processor circuit for a software routine to access the rules and perform an analysis of a current request.

The authorization server computer 602 may also comprise a network interface 607. The network interface 607 may receive authorization requests from a requesting computer 613. The network interface may also transmit authorization responses to the requesting computer.

The authorization server computer 602 may also comprise a storage medium 609. The storage medium 609 may be a non-transitory computer-readable storage medium. The storage medium 609 may store data for use by the processor circuit 608. The processor circuit 608 may also load data stored in the storage medium 609 into the memory circuit 610. The storage medium 609 may store instructions 614. The code 614 may be executable by the processor circuit for implementing the methods for operating authorization rules described here.

The network interface 607 of the authorization server computer 602 may be coupled to an account database 603. The account database 603 may comprise a non-transitory computer readable storage medium. The account database may store account information and/or credentials for entities that are authorized to access a resource. The authorization server computer 602 may compare the account information and credentials stored in the account database 603 to those in an authorization request from a requesting computer in determining whether to grant the requesting computer access to the resource.

The network interface 607 of the authorization server computer 602 may also be coupled to a rule database 604. The rule database 604 may comprise a non-transitory computer readable storage medium. The rule database 604 may be used by the authorization server computer 602 to store authorization rules. The rule database 604 may also store stand-by authorization rules. For each rule, the rule database 604 may also store the conditions for satisfying that authorization rule. The rule database 604 may also store statistics regarding each authorization rule, such its accuracy rate (e.g., false positive rate) and trigger frequency. The rule database 604 may also store validity information for each of the authorization rules as determined by an independent process.

The network interface 607 of the authorization server computer 602 may be coupled to a request database 605. The request database 605 may comprise a non-transitory computer readable storage medium. The request database 605 may be used by the authorization server computer 602 to store one or more authorization requests. The request database 605 may store parameters of each authorization request, such as an authorization request identifier, a requesting computer identifier, an account identifier, an account credential, a geo-location, or any other suitable information. The request database 605 may also comprise information indicating the outcome of the authorization request (e.g., whether it was rejected, accepted, or labeled for review).

The network interface 607 of the authorization server computer 602 may be coupled to a rule modification database 606. The rule modification database 606 may comprise a non-transitory computer readable storage medium. The rule modification database 606 may be used by the authorization server computer 602 to store a modification log containing details regarding the specific conditions for each authorization rule and each modification made to that authorization rule. The authorization server computer 602 may review the modification log in order to optimize the authorization rules and track accuracy and performed of the authorization rules over time.

VII. Exemplary Method

Figure 7:
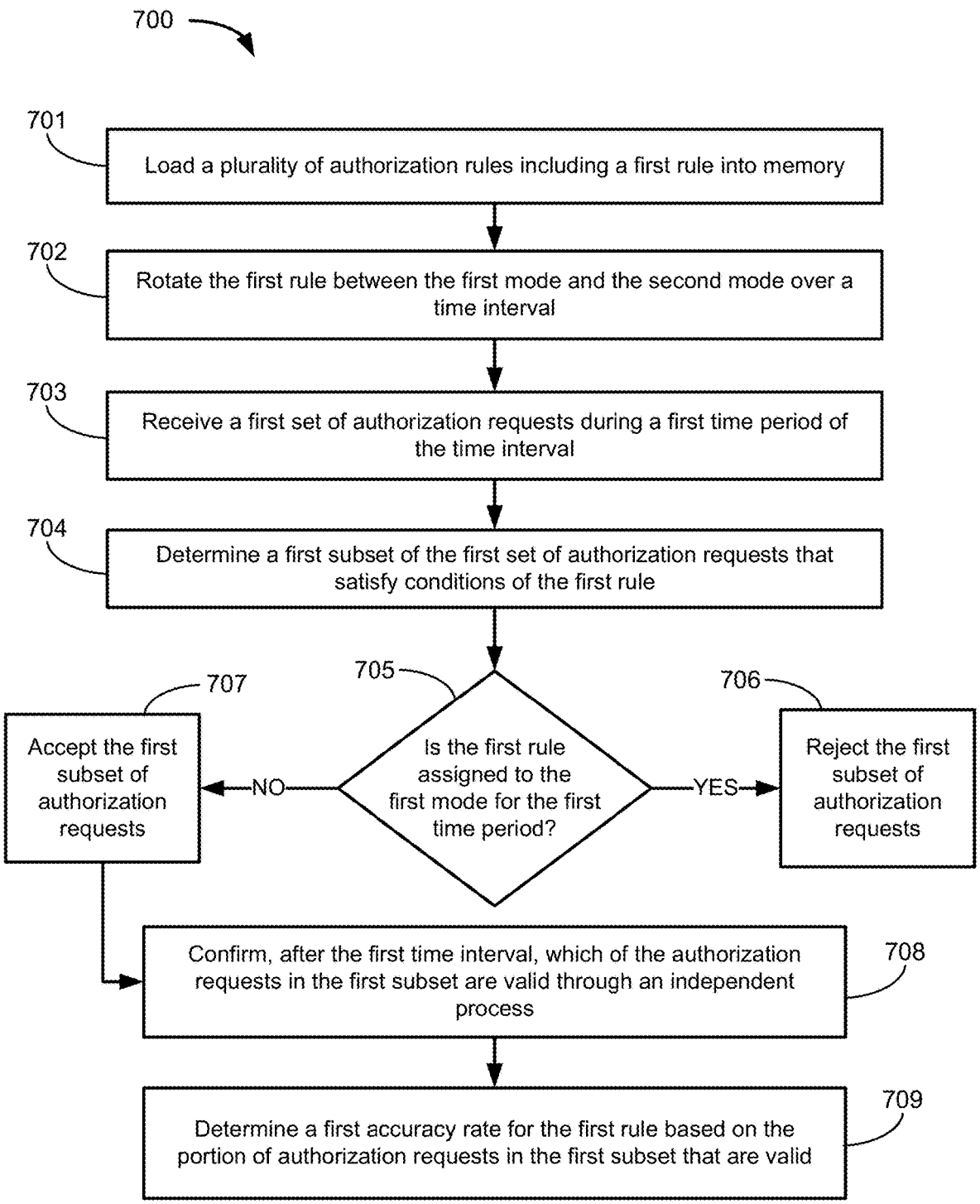
FIG. 7 is a flow chart of a method for operating authorization rules.

FIG. 7 is a flow chart 700 of a method for operating authorization rules. The flow chart 700 is simplified for clarity. However, the method for operating authorization rules can further include any combination of the methods for operating authorization rules described herein. The method for operating authorization rules may be performed by a computer, such as the authorization server computer 602 described above with reference to FIG. 6.

At step 701, the method loads a plurality of authorization rules including a first rule into a memory circuit. Each authorization rule of the plurality of authorization rules may be assigned to a first mode (e.g., a prevention mode which is used to reject authorization requests) or a second mode (e.g., a surveillance mode which is not used to reject authorization requests). Each authorization rule may be used to reject authorization requests that satisfy its conditions when that authorization rule is assigned to the first mode (e.g., the prevention mode). Each authorization rule may not be used to reject authorization requests when that authorization rule assigned to the second mode (e.g., the surveillance mode).

At Step 702, the method may rotate the first rule between the first mode and the second mode over a time interval. For example, an authorization server may toggle an authorization rule between the prevention mode and the surveillance mode according to a schedule. The rotation of the first rule may be randomly determined or it may be pre-determined.

At step 703, the method may receive a first set of authorization requests during a first time period of the time interval. For example, the first time period may be a day and the time interval may be a number of weeks or a month. The time period may also be a certain number of seconds, minutes, or hours.

At step 704, the method may determine a first subset of the first set of authorization requests that satisfy one or more conditions of the first rule. The determination of whether a certain authorization request satisfies conditions of the first rule may be based on the parameters of that authorization request as described herein.

At decision step 705, the method determine whether the first rule is assigned to the first mode (e.g., the prevention mode) or the second mode (e.g., the surveillance mode) during the first time period. If the first rule is assigned to the first mode in the first time period (e.g., yes, it is assigned to the first mode), then the method continues from decision step 705 to step 706. At step 706, the method rejects the authorization requests in the first subset of authorization requests since these authorization requests satisfied conditions of the first rule, which was assigned to the first mode (e.g., prevention mode). In other embodiments, the first mode may be a different operating mode, instead of the prevention mode. In other embodiments, the second mode may be a different operating mode, instead of the surveillance mode.

If the first rule is not assigned to the first mode for the first time period (e.g., it is assigned to the second mode instead), then the method continues from decision step 705 to step 707. At step 707, the method accepts the first subset of authorization requests. The method may accept the first subset of authorization requests because the first rule is assigned to the second mode (e.g., the surveillance mode) and the authorization requests of the first subset do not satisfy the conditions of any other authorization rules of the plurality of authorization rules that are assigned to the first mode during the first time period.

At step 708, the method confirms, after the first time interval has passed, which of the authorization requests in the first subset are valid through an independent process. At step 709, the method determines a first accuracy rate (e.g., a rate of false positives) for the first rule based on the portion of authorization requests in the first subset that are valid. Determining the accuracy rate for the first rule is advantageous because the conditions of the first rule may be modified to optimize (e.g., improve the accuracy) of the first rule as described herein. The authorization server may modify the one or more conditions of the first rule based on the first accuracy rate such that the first accuracy rate is improved. The authorization server may also replace the first rule with a new authorization rule.

As described herein, the authorization rules may apply to authorization requests that request access to a building, a computer account, or a transaction account. However, the systems and methods for operating and optimizing authorization rules described herein may be applied to a request for access to any type of resource where it is possible to determine the validity of the request by some process. I, the systems and methods for operating and optimizing authorization rules described herein may be applied to any type of rule set having results that can be determined as a false positive or a true positive.

VIII. Advantages

The systems and methods for operating authorization rules described herein provide several advantages. One advantage is that the authorization rules may be evaluated and optimized in surveillance mode while also being used for rejection. For example, each authorization rule may be optimized by determining its accuracy rate and modifying conditions of the to improve its accuracy based. As such, performance may be measured routinely for each and every authorization rules, including any authorization rules that have been recently modified or updated. Based on the measured performance, the authorization system can select authorization rules having the best performance to replace performance decayed ones. Accordingly, the authorization system described herein may provide for a reduced false positive rate and a reduced false negative rate. As such, more valid authorization requests are inadvertently accepted and less invalid authorization request are inadvertently rejected, thereby reducing the amount of human, computing, and financial resources used to handle such mistakes in authorization.

Another advantage is that constant measurement and evaluation of the authorization rules, followed by modification of existing rules, the addition of new rules, and the removal of decayed rules, allows for the authorization system to operate at an optimum performance level. Another advantage is that the authorization system may be configured to automatically evaluate and modify the authorization rules, thereby reducing the amount human, computing, and financial resources used in operating the authorization system.

Another advantage is that the authorization system may easily deal with new changes in fraud patterns by rotating new authorization rules into the system for prevention mode. As such, new rules can be continuously produced and incrementally rotated into the authorization system. Another advantage is that it is more difficult for fraud to occur since an outside cannot determine the operation of the authorization system since it changes frequently.

As such, the systems and methods for operating authorization rules improve the authorization server's operation. Other advantages provided by the systems and methods for operating authorization rules include more secure access to resources and reduced instances of a valid authorization request being rejected.

IX. Example Computer Systems

The various participants and elements described herein may operate one or more computer apparatuses to facilitate the functions described herein. Any of the elements in the above-described figures, including any servers or databases, may use any suitable number of subsystems to facilitate the functions described herein.

Such subsystems or components are interconnected via a system bus. Subsystems may include a printer, keyboard, fixed disk (or other memory comprising computer readable media), monitor, which is coupled to display adapter, and others. Peripherals and input/output (I/O) devices, which couple to an I/O controller (which can be a processor or other suitable controller), can be connected to the computer system by any number of means known in the art, such as a serial port. For example, a serial port or an external interface can be used to connect the computer apparatus to a wide area network such as the Internet, a mouse input device, or a scanner. The interconnection via the system bus allows the central processor to communicate with each subsystem and to control the execution of instructions from system memory or the fixed disk, as well as the exchange of information between subsystems. The system memory and/or the fixed disk may embody a computer readable medium.

As described, the embodiments may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer system for managing a plurality of authorization rules that are loaded for processing authorizations requests, each authorization rule of the plurality of authorization rules including one or more conditions, the computer system comprising:

a processor circuit; and a non-transitory computer-readable storage medium coupled to the processor circuit and storing code executable by the processor circuit for performing an operation comprising:

determining a first subset of a first set of authorization requests that satisfy the one or more conditions of a first rule of the plurality of authorization rules, the first set of authorization requests being made during a first time period of a time interval, the first rule being rotated between a first mode and a second mode over the time interval, the first rule being assigned to the second mode during the first time period, the first rule not being used to reject the first subset of the first set of authorization requests when assigned to the second mode;

confirming, after the time interval, which authorization requests of the first subset are valid through an independent process; and determining a first accuracy rate for the first rule based on a portion of authorization requests in the first subset that are valid.

2. The computer system of claim 1, further comprising a network interface, the operation further comprising receiving, using the network interface, the first set of authorization requests from a plurality of requesting computers.

3. The computer system of claim 1, wherein the first rule is assigned to the second mode during the first time period and wherein the first rule is not used to reject authorization requests when assigned to the second mode.

4. The computer system of claim 1, the operation further comprising rotating a second rule between the first mode and the second mode in response to the rotation of the first rule between the first mode and the second mode, the second rule being assigned to the first mode when the first rule is assigned to the second mode and assigned to the second mode when the first rule is assigned to the first mode.

5. The computer system of claim 1, the operation further comprising:

dividing the plurality of authorization rules into a first group of authorization rules and a second group of authorization rules, the first group of authorization rules including the first rule;

selecting the first group of authorization rules to be assigned to the second mode during the first time period; and assigning the authorization rules of the first group of authorization rules to the second mode during the first time period and assigning the authorization rules of the second group of authorization rules to the first mode, wherein rotating the first rule between the first mode and the second mode is based on the selection of the first group of authorization rules to be assigned to the second mode.

6. The computer system of claim 5, wherein the assigning of the first group of authorization rules to the second mode and the second group of authorization rules to the first mode is based on a target rejection rate.

7. The computer system of claim 5, the operation further comprising determining a first trigger frequency of the first rule based on a number of authorization requests that satisfied the one or more conditions of the first rule and a total number of authorization requests, wherein the assigning of the first group of authorization rules to the second mode and the second group of authorization rules to the first mode is based on the first trigger frequency.

8. The computer system of claim 1, the operation further comprising modifying the one or more conditions of the first rule based on the first accuracy rate.

9. The computer system of claim 1, the operation further comprising:

receiving a second set of authorization requests during a second time period of the time interval, the first rule being set to the first mode during the second time period;

determining a second subset of the second set of authorization requests that satisfy the conditions of the first rule; and transmitting, to a plurality of requesting computers, authorization responses including outcome indications rejecting the second subset of the second set of authorization requests that satisfy the conditions of the first rule.

10. The computer system of claim 1, wherein rotating the first rule between the first mode and the second mode is based on a pre-determined amount of time within the time interval or a pre-determined number of authorization requests having been received within the time interval.

11. The computer system of claim 1, the operation further comprising:

determining accuracy rates for each of the plurality of authorization rules based on the independent process; and determining a fraud attempting rate based on a combination of the accuracy rates of the plurality of authorization rules.

12. The computer system of claim 1, the operation further comprising transmitting, via a network interface, a first authorization response to a corresponding requesting computer for a first authorization request of the first subset of the first set of authorization requests, the first authorization response indicating that the first authorization request is accepted.

13. A method for managing a plurality of authorization rules that are loaded for processing authorizations requests, each authorization rule of the plurality of authorization rules including one or more conditions, the method comprising:

determining a first subset of a first set of authorization requests that satisfy the one or more conditions of a first rule of the plurality of authorization rules, the first set of authorization requests being made during a first time period of a time interval, the first rule being rotated between a first mode and a second mode over the time interval, the first rule being assigned to the second mode during the first time period, the first rule not being used to reject the first subset of the first set of authorization requests when assigned to the second mode;

confirming, after the time interval, which authorization requests of the first subset are valid through an independent process; and determining a first accuracy rate for the first rule based on a portion of authorization requests in the first subset that are valid.

14. The method of claim 13, further comprising receiving, using a network interface, the first set of authorization requests from a plurality of requesting computers.

15. The method of claim 13, wherein the first rule is assigned to the second mode during the first time period, and wherein the first rule is not used to reject authorization requests when assigned to the second mode.

16. The method of claim 13, rotating a second rule between the first mode and the second mode in response to the rotation of the first rule between the first mode and the second mode, the second rule being assigned to the first mode when the first rule is assigned to the second mode and assigned to the second mode when the first rule is assigned to the first mode.

17. The method of claim 13, further comprising:
dividing the plurality of authorization rules into a first group of authorization rules and a second group of authorization rules, the first group of authorization rules including the first rule;
selecting the first group of authorization rules to be assigned to the second mode during the first time period;
assigning the authorization rules of the first group of authorization rules to the second mode during the first time period and assigning the authorization rules of the second group of authorization rules to the first mode, wherein rotating the first rule between the first mode and the second mode is based on the selection of the first group of authorization rules to be assigned to the second mode, wherein the selection of the at least one of the first group of authorization rules and the second group of authorization rules is based on a target rejection; and determining the a first trigger frequency of the first rule based on a number of authorization requests that satisfied the one or more conditions of the first rule and a total number of authorization requests, wherein the assignment of the first group of authorization rules to the second mode and the second group of authorization rules to the first mode is based on the first trigger frequency.

18. The method of claim 13, further comprising modifying the one or more conditions of the first rule based on the first accuracy rate.

19. The method of claim 13, wherein rotating the first rule between the first mode and the second mode is based on a pre-determined amount of time within the time interval or a pre-determined number of authorization requests having been received within the time interval.

20. The method of claim 13, further comprising:
determining accuracy rates for each of the plurality of authorization rules based on the independent process; and
determining a fraud attempting rate based on a combination of the accuracy rates of the plurality of authorization rules.

* * * * *